United States Patent

Sumpter et al.

[11] Patent Number: 5,610,213
[45] Date of Patent: Mar. 11, 1997

[54] HEAT CURED RUBBERS

[75] Inventors: Chris A. Sumpter, Scotia; Brian J. Ward, Valley Falls, both of N.Y.

[73] Assignee: General Electric Company, Waterford, N.Y.

[21] Appl. No.: 497,275

[22] Filed: Jun. 30, 1995

[51] Int. Cl.$^6$ .................................................. C08K 5/54
[52] U.S. Cl. ..................... 524/267; 524/493; 524/847; 525/477; 528/24
[58] Field of Search ............... 528/24; 525/477; 524/847, 493, 267

[56] References Cited

U.S. PATENT DOCUMENTS

| | | |
|---|---|---|
| 2,803,619 | 8/1957 | Dickman . |
| 3,817,910 | 6/1974 | Vikmar . |
| 4,539,357 | 9/1985 | Bobear . |
| 4,690,967 | 9/1987 | LaGarde et al. . |
| 5,153,244 | 10/1992 | Akitomo et al. . |
| 5,219,922 | 6/1993 | Steinberger et al. . |
| 5,260,364 | 11/1993 | Johnson . |

*Primary Examiner*—Melvyn I. Marquis
*Attorney, Agent, or Firm*—Kenneth S. Wheelock

[57] ABSTRACT

Cold processable heat curable alkenyl silicone rubbers that comprising an alkenyl silicone gum or mixture of alkenyl silicone gums selected from the group of alkenyl silicone gums having the formula:

$$(M_a M^{vi}_{1-a})(D^{vi})_x(D)_y(M_a M^{vi}_{1-a});$$

a process for making such heat curable rubbers, and articles of manufacture made therefrom.

21 Claims, No Drawings

HEAT CURED RUBBERS

FIELD OF THE INVENTION

The present invention relates to heat curable alkenyl silicone rubber formulations suitable for use as gaskets wherein low compression set and an improved sealing force retention are achieved by the use of high vinyl content gums and fumed silica fillers that have been treated wherein the surface hydroxyl content is below a given threshold value.

BACKGROUND OF THE INVENTION

Most heat-curing silicone rubbers are based on high molecular weight silicone polymer gums. Gums, fillers, and additives are mixed in dough mixers or Banbury type mixers or mills to produce the heat curable formulation. Curing catalysts are added on water cooled rubber mills, to avoid premature heat cure, which can sometimes be used for the entire formulation in small-scale processes.

Silicone rubbers are commercially available as gums, filler-reinforced gums, dispersions, and uncatalyzed and ready-to-use catalyzed mixtures. The following types of gums are commercially available:
1) general purpose gums based on methyl and vinyl gums,
2) high and low temperature gums based on phenyl, vinyl, and methyl gums,
3) low compression set gums based on methyl and vinyl gums,
4) low shrink gums, i.e. gums which have been devolatilized, and
5) solvent resistant gums, based on fluorosilicone gums.

The consistency of uncured rubber mixtures ranges from a tough putty to a hard deformable plastic. Those rubbers containing reinforcing fillers tend to stiffen on storage due to the development of structure in the filler. Low viscosity fluids added to the rubber, such as water, diphenylsilanediol, or silicone fluids inhibit stiffening and the development of structure.

The properties of fabricated rubber depend not only on the chemical nature of the gum but also on the properties of the filler, additives, and type of curing catalyst. Consequently, the resultant property profile of a given heat cured silicone rubber is highly dependent on the chemical nature of the various constituent components as well as the relative proportions of those components. For example, a high filler content increases hardness and solvent resistance of the resulting rubber. Such increased hardness and solvent resistance however, comes at the price of a reduced elongation.

Not only do the properties of heat cured silicone rubber vary with the nature of the silicone gum and the various additives as well as their respective proportions but the properties also vary as a result of the various procedures used to compound the rubber. Properties of a heat cured rubber may therefore vary as a function of the thoroughness of the mixing and the degree of wetting of the filler by the gum. All other factors being equal, a hydrophilic filler as opposed to a hydrophobic filler will impart significantly different properties to a finished rubber.

Further, properties of heat cured rubbers change with time. This is particularly true during the initial periods of the curing reaction. Since silicone rubbers are complex chemical mixtures, the cure reactions and associated side reactions never completely stop although they may slow down considerably after the initial cure. The properties of a heat cured rubber change slowly with age.

Silicone rubbers may be cured by one of three general curing techniques:
1) hydrosilylation,
2) free radical initiation, and
3) high energy radiation initiation.

For a hydrosilylation cure, high molecular weight polymers, i.e. gums, possessing a vinyl functionality are reacted with low molecular weight hydride-functional cross-linking agents. A stable platinum complex, functioning as a catalyst, is added along with an inhibitor to prevent cure initiation prior to heating.

Free radical curing of silicone rubbers is effected by heating the rubber precursor in the presence of a free radical initiator such as benzoyl peroxide. The predominant mechanism operating involves hydrogen abstraction from the methyl groups of the dimethylsiloxane moiety followed by radical attack on another methyl group creating a crosslinking ethylene bridge. If a small percentage of vinyl groups are present, the methyl radical can add to the vinylic double bond. In addition to benzoyl peroxide, other radical cure initiators include bis(2,4-dichlorobenzoyl)peroxide, tert-butyl peroxybenzoate, dicumyl peroxide, 2,5-dimethyl-di-(tert-butylperoxy)hexane, and 1,1-di-(tert-butylperoxy)trimethylcyclohexane. Both 2,5-dimethyl-di-(tert-butylperoxy)hexane, and 1,1-di-(tert-butylperoxy)-trimethylcyclohexane are particularly useful and specific as free radical cure initiators for vinyl silicone heat cured rubbers.

High energy radiation, either as gamma rays or as an electron beam, can also effect cures. This type of cure causes a wide variety of bonds to be broken, thus cross-links occur between a variety of different atomic centers as the radicals created by the high energy recombine to form new chemical bonds.

When a heat cured rubber formulation is used to manufacture products such as gaskets, the particular end use and the environment of that end use govern how the material is formulated and processed. In the case of gaskets, compression set, sealing force, and retention of sealing force are important measure s of performance. Compression set has been a significant factor in heat cured rubber technology for many years.

U.S. Pat. No. 2,803,619 discloses a polydimethylsiloxane gum filled with fumed silica and diatomaceous earth having a low compression set. The heat cured rubber of the '619 patent was cured by a peroxide initiated vulcanization lasting five minutes at 150° C. followed by a twenty-four hour cure at 250° C. Subsequently after an additional twenty-two hours at 150° C., the compression set of the finished rubber was measured.

Curing of a heat cured rubber begins when the cure is initiated during the molding process. The cure must be sufficiently rapid that the article can be removed from the mold without deformation. Yet the requirement that the finished product possess elastomeric properties in some degree means that the cure cannot proceed to the extent that the initially elastomeric heat cured rubber is no longer deformable. Thus the kinetics of the cure reaction must be carefully balanced for a rapid initial cure.

Subsequent developments have focused on three technical issues:
1) in-situ filler treatment,
2) post-reaction catalyst inhibition, and
3) additives.

In-situ filler treatment may be divided into two broad classes: 1) vinyl silazane treatment of the filler, and 2) vinyl alkoxy silane treatments.

In the case of free-radical cures, generally peroxide initiated, the initiator is consumed. Use of gamma radiation or high energy electron beams also leaves no reactive residues in the rubber. When a hydrosilylation catalyst is used to effect a cure in a vinyl-hydride compound rubber, the cure must be controlled because the catalyst is not destroyed by the cure reaction. Thus a large variety of inhibitor compounds have been used: alkaline earth metal silicates (U.S. Pat. No. 3,817,910), metal sulfides (U.S. Pat. No. 5,219,922), boron compounds (U.S. Pat. No. 4,690,967), and various organic compounds (U.S. Pat. No. 5,153,244).

Additives to heat cured rubbers to control compression set most frequently involve the addition of substituted silicone resins. Recently, in sharp contrast, spinels have been used to control compression set (U.S. Pat. No. 5,260,364). Since the silicone resins added to the heat cured rubber formulation for compression set control are highly branched silicone resins, depending on when these resins are added can sometimes lead to the conclusion that these materials form part of the elastomeric matrix of the heat cured rubber.

A current problem not yet solved by the art deals with the incompletely reacted surface silanol groups of the various silica fillers currently in use. The presence of reactive, i.e. unreacted, surface hydroxyl or silanol groups in a silica filler leads to condensation reactions and structuring of the filler. One solution currently in use is to use silanol or methoxy stopped silicone fluids as blending agents to assist in dispersing the filler into the gum and also provide a reaction center that does not lead to structuring of the filler. In a sense, these blending agents are reactive diluents as they react with the filler surface hydroxyl or silanol groups preventing the condensation reactions between filler particles or filler and gum molecules that lead to stiffening and a loss of elastomeric properties.

SUMMARY OF THE INVENTION

The present invention provides for a class of cold processable heat curable alkenyl silicone rubbers that comprise:
(1) an alkenyl silicone gum or mixture of alkenyl silicone gums selected from the group of alkenyl silicone gums having the formula:

$$(M_a M^{vi}_{1-a})(D^{vi})_x(D)_y(M_a M^{vi}_{1-a})$$

where a is zero or one and x and y are zero or integers whereby the sum of x+y yields a gum having a viscosity ranging from about 200,000 to about 200,000,000 centipoise at 25° C. and whereby the sum of a+x+y yields a gum having an alkenyl content ranging from about 0.20 to about 14.00 weight percent, subject to the limitation that x must be greater than zero when a is one, where $M=R^1_3SiO_{1/2}$ with $R^1$ selected from the group consisting of 1 to 8 carbon atom alkyl groups, phenyl, and trifluoropropyl;

$M^{vi}=R^2(R^1)_2SiO_{1/2}$ with $R^1$ selected from the group consisting of 1 to 8 carbon atom alkyl groups, phenyl, and trifluoropropyl and $R^2$ selected from the group of 2 to 10 carbon atom linear or cyclic alkenyl groups;

$D^{vi}=R^2(R^1)SiO_{2/2}$ where $R^1$ and $R^2$ are as previously defined;

$D=(R^3)_2SiO_{2/2}$ where each $R^3$ is independently selected from the group consisting of 1 to 8 carbon atom alkyl groups, phenyl, and trifluoropropyl; and (2) a vinyl specific peroxide curing agent.

When a mixture of gums is used, a preferred mixture comprises at least three gums defined by the formulas:

(1) $M^{vi}D^{vi}DM^{vi}$;
(2) $M^{vi}DM^{vi}$; and
(3) $MD^{vi}M$.

The gums of the present invention are amenable to incorporating various additives, fillers, extenders and diluents. For example when a diluent gum is used in conjunction with the alkenyl silicones of the present invention, a gum having the formula:

MDM, and having a viscosity ranging from 200,000 to 200,000,000 centipoise at 25° C. is particularly preferred.

A particularly useful specific embodiment of the present invention comprises:
(a) from about 5 parts by weight to about 100 parts by weight of a vinyl on chain vinyl stopped gum having the formula:

$$M^{vi}D^{vi}_xD_yM^{vi}$$

where x and y are different integers greater than zero and the sum of x and y have values whereby the viscosity of (a) is between 200,000 and 200,000,000 cps and the alkenyl level varies from about 0.20 weight percent to about 14.00 weight percent;

(b) from about 0.2 parts by weight to about 95 parts by weight of a vinyl stopped gum having the following formula:

$$M^{vi}D_zM^{vi}$$

where z is an integer greater than zero having a value whereby the viscosity of (b) is between 200,000 and 200,000,000 cps and the alkenyl level varies from about 150 to about 350 weight parts per million;

(c) from 0.2 parts by weight to about 75 parts by weight of a vinyl on chain gum having non-reactive end groups with the following formula:

$$MD^{vi}_qM$$

where q is an integer greater than zero whereby the viscosity of (c) is between 200,000 and 200,000,000 cps and the alkenyl level varies from about 0.10 weight per cent to about 14.00 weight percent;

(d) from about 0.0001 parts by weight to about 30 parts by weight of a diluent gum having the following formula:

$$MD_wM$$

where w is an integer greater than zero whereby the viscosity of (d) is between 200,000 and 200,000,000 cps;

whereby the quantities present of the components (a), (b), (c), and (d) add to 100 parts by weight;

(e) from about 0.1 parts by weight to about 5 parts by weight of an MQ resin, as a mold release agent, having a viscosity between 500 and 50,000 centipoise, where the M:Q ratio between about 0.8:1.0 and about 0.8:1.5;

whereby the quantities present of the components (a), (b), (c), (d), and (e) add to between about 100.1 parts by weight to about 105 parts by weight;

(f) from about 15 to about 80 parts by weight of a fumed silica filler functioning as a reinforcing filler, having a BET surface area in the range of 90–400 m²/gm where the residual level of surface hydroxyl groups determined by nitrogenous base chemisorption and magic angle spinning solid state nmr is below a threshold value of 3.1 hydroxyl groups/nm$^2$; whereby the quantities present of the components (a), (b), (c), (d), (e) and (f) add to between 115.1 parts by weight and 185 parts by weight;

(g) from about 0.01 to about 1.5 parts by weight of a vinyl specific peroxide curing agent; whereby the quantities present of the components (a), (b), (c), (d), (e), (f) and (g) add to between 115.11 parts by weight and 186.5 parts by weight; where:

$M=R^1{}_3SiO_{1/2}$ with $R^1$ selected from the group consisting of 1 to 8 carbon atom alkyl groups, phenyl, and trifluoropropyl;

$M^{vi}=R^2(R^1)_2SiO_{1/2}$ with $R^1$ selected from the group consisting of 1 to 8 carbon atom alkyl groups, phenyl, and trifluoropropyl and $R^2$ selected from the group of 2 to 10 carbon atom linear or cyclic alkenyl groups;

$D^{vi}=R^2(R^1)SiO_{2/2}$ where $R^1$ and $R^2$ are as previously defined;

$D=(R^3)_2SiO_{2/2}$ where each $R^3$ is independently selected from the group consisting of 1 to 8 carbon atom alkyl groups, phenyl, and trifluoropropyl; and $Q=SiO_{4/2}$.

The curable rubbers of the present invention may be made by a cold mixing process comprising the steps of:

(a) mixing a curable component selected from the group of alkenyl silicone gums having the formula:

$(M_aM^{vi}{}_{1-a})(D^{vi})_x(D)_y(M_aM^{vi}{}_{1-a})$ with a vinyl specific peroxide curing agent; and (b) controlling the temperature of the mixing whereby the temperature of the mixture does not exceed 80° C. during the process of mixing.

Further, the heat cured rubbers and articles of manufacture made from the composition of the present invention exhibit improved compression set and have markedly improved heat age properties.

DETAILED DESCRIPTION OF THE INVENTION

The present invention provides for a class of cold processable heat curable alkenyl silicone rubbers that comprise:
(1) an alkenyl silicone gum or mixture of alkenyl silicone gums selected from the group of alkenyl silicone gums having the formula:

$(M_aM^{vi}{}_{1-a})(D^{vi})_x(D)_y(M_aM^{vi}{}_{1-a})$ where a is zero or one and x and y are zero or integers whereby the sum of x+y yields a gum having a viscosity ranging from about 200,000 to about 200,000,000 centipoise at 25° C. and whereby the sum of a+x+y yields a gum having an alkenyl content ranging from about 0.20 to about 14.00 weight percent, subject to the limitation that x must be greater than zero when a is zero, where $M=R^1{}_3SiO_{1/2}$ with $R^1$ selected from the group consisting of 1 to 8 carbon atom alkyl groups, phenyl, and trifluoropropyl;

$M^{vi}=R^2(R^1)_2SiO_{1/2}$ with $R^1$ selected from the group consisting of 1 to 8 carbon atom alkyl groups, phenyl, and trifluoropropyl and $R^2$ selected from the group of 2 to 10 carbon atom linear or cyclic alkenyl groups;

$D^{vi}=R^2(R^1)SiO_{2/2}$ where $R^1$ and $R^2$ are as previously defined;

$D=(R^3)_2SiO_{2/2}$ where each $R^3$ is independently selected from the group consisting of 1 to 8 carbon atom alkyl groups, phenyl, and trifluoropropyl; and (2) a vinyl specific peroxide curing agent.

When a mixture of gums is used, a preferred mixture comprises at least three gums defined by the formulas:
(1) $M^{vi}D^{vi}DM^{vi}$;
(2) $M^{vi}DM^{vi}$; and
(3) $MD^{vi}M$.

The gums of the present invention are amenable to incorporating various additives, fillers, extenders and diluents. For example when a diluent gum is used in conjunction with the alkenyl silicones of the present invention, a gum having the formula:

MDM, and having a viscosity ranging from 200,000 to 200,000,000 centipoise at 25° C. is particularly preferred.

A particularly useful specific embodiment of the present invention comprises:

(a) from about 5 parts by weight to about 100 parts by weight of a vinyl on chain vinyl stopped gum having the formula:

$M^{vi}D^{vi}{}_xD_yM^{vi}$ where x and y are different integers greater than zero and the sum of x and y have values whereby the viscosity of (a) is between 200,000 and 200,000,000 cps and the alkenyl level varies from about 0.20 weight percent to about 14.00 weight percent;

(b) from about 0.2 parts by weight to about 95 parts by weight of a vinyl stopped gum having the following formula:

$M^{vi}D_zM^{vi}$ where z is an integer greater than zero having a value whereby the viscosity of (b) is between 200,000 and 200,000,000 cps and the alkenyl level varies from about 150 to about 350 weight parts per million;

(c) from 0.2 parts by weight to about 75 parts by weight of a vinyl on chain gum having non-reactive end groups with the following formula:

$MD^{vi}{}_qM$ where q is an integer greater than zero whereby the viscosity of (c) is between 200,000 and 200,000,000 cps and the alkenyl level varies from about 0.10 weight per cent to about 14.00 weight percent;

(d) from about 0.0001 parts by weight to about 30 parts by weight of a diluent gum having the following formula:

$MD_wM$ where w is an integer greater than zero whereby the viscosity of (d) is between 200,000 and 200,000,000 cps;

whereby the quantifies present of the components (a), (b), (c), and (d) add to 100 parts by weight;

(e) from about 0.1 parts by weight to about 5 parts by weight of an MQ resin, as a mold release agent, having a viscosity between 500 and 50,000 centipoise, where the M:Q ratio between about 0.8:1.0 and about 0.8:1.5;

whereby the quantities present of the components (a), (b), (c), (d), and (e) add to between about 100.1 parts by weight to about 105 parts by weight;

(f) from about 15 to about 80 parts by weight of a fumed silica filler functioning as a reinforcing filler, having a BET surface area in the range of 90–400 m²/gm where the residual level of surface hydroxyl groups determined by nitrogenous base chemisorption and magic angle spinning solid state nmr is below a threshold value of 3.1 hydroxyl groups/nm²; whereby the quantities present of the components (a), (b), (c), (d), (e) and (f) add to between 115.1 parts by weight and 185 parts by weight;

(g) from about 0.01 to about 1.5 parts by weight of a vinyl specific peroxide curing agent; whereby the quantities present of the components (a), (b), (c), (d), (e), (f) and (g) add to between 115.11 parts by weight and 186.5 parts by weight; where:

$M=R^1_3SiO_{1/2}$ with $R^1$ selected from the group consisting of 1 to 8 carbon atom alkyl groups, phenyl, and trifluoropropyl;

$M^{vi}=R^2(R^1)_2SiO_{1/2}$ with $R^1$ selected from the group consisting of 1 to 8 carbon atom alkyl groups, phenyl, and trifluoropropyl and $R^2$ selected from the group of 2 to 10 carbon atom linear or cyclic alkenyl groups;

$D^{vi}=R^2(R^1)SiO_{2/2}$ where $R^1$ and $R^2$ are as previously defined;

$D=(R^3)_2SiO_{2/2}$ where each $R^3$ is independently selected from the group consisting of 1 to 8 carbon atom alkyl groups, phenyl, and trifluoropropyl; and $Q=SiO_{4/2}$.

The curable rubbers of the present invention may be made by a cold mixing process comprising the steps of:

(a) mixing a curable component selected from the group of alkenyl silicone gums having the formula:
$(M_aM^{vi}_{1-a})(D^{vi})_x(D)_y(M_aM^{vi}_{1-a})$ with a vinyl specific peroxide curing agent; and (b) controlling the temperature of the mixing whereby the temperature of the mixture does not exceed 100° C., preferably 90° C., more preferably 80° C. and most preferably 65° C. during the process of mixing.

Further, the heat cured rubbers and articles of manufacture made from the composition of the present invention exhibit improved compression set and have markedly improved heat age properties. The heat cured rubbers made with the composition of the present invention are useful for gaskets, bushings, o-rings, tubing, medical tubing, gas masks, catheters, windshield wiper blades, spatula blades, automobile radiator hoses, spark plug boots, keyboard keypads, baby bottle nipples, electrical connectors, grommets, seals, diving masks, snorkels, earplugs, mouthguards, and foamed heat cured rubber products.

One very specific embodiment of the present invention relates to a heat curable silicone rubber composition that is cold processable consisting essentially of a mixture of the following components:

(a) a vinyl on chain vinyl stopped gum having the formula:

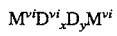

where x and y are different integers greater than zero and the sum of x and y have values whereby the viscosity of (a) is between 200,000 and 200,000,000 cps and the alkenyl level varies from about 0.20 weight percent to about 14.00 weight percent;

(b) a vinyl stopped gum having the following formula:

where z is an integer greater than zero having a value whereby the viscosity of (b) is between 200,000 and 200,000,000 cps and the alkenyl level varies from about 150 to about 350 weight parts per million;

(c) a vinyl on chain gum having non-reactive end groups with the following formula:

where q is an integer greater than zero whereby the viscosity of (c) is between 200,000 and 200,000,000 cps and the alkenyl level varies from about 0.10 weight per cent to about 14.00 weight percent;

(d) an optional diluent gum having the following formula:
$MD_wM$ where w is an integer greater than zero whereby the viscosity of (d) is between 200,000 and 200,000,000 cps;

(e) an MQ resin, as a mold release agent, having a viscosity between 500 and 50,000 centipoise, where the ratio M:Q varies between about 0.8:1.0 and about 0.8:1.8;

(f) a fumed silica filler functioning as a reinforcing filler, having a BET surface area in the range of 90–400 m²/gm where the residual level of surface hydroxyl groups determined by nitrogenous base chemisorption or magic angle spinning solid state nmr is below a threshold value of 3.1 hydroxyl groups/nm²; and (g) any of several vinyl specific peroxide curing agents. The formulation may also contain extending fillers and other additives designed to impart specific performance properties.

In the components of the present invention, applicants define the following structures:

$M=R^1_3SiO_{1/2}$ where $R^1$ is selected from the group consisting of 1 to 8 carbon atom alkyl groups, phenyl, and trifluoropropyl;

$M^{vi}=R^2(R^1)_2SiO_{1/2}$ where $R^1$ is selected from the group consisting of 1 to 8 carbon atom alkyl groups, phenyl, and trifluoropropyl and $R^2$ is selected from the group of 2 to 10 carbon atom linear or cyclic alkenyl groups;

$D^{vi}_x=R^2(R^1)SiO_{2/2}$ where the R groups are a s previously defined;

$D=(R^3)_2SiO_{2/2}$ where each $R^3$ group is independently selected from the group consisting of 1 to 8 carbon atom alkyl groups, phenyl, and trifluoropropyl; and $Q=SiO_{4/2}$. All of the gum components utilized by the present invention have a viscosity ranging from 200,000 to 200,000,000 centipoise at 25° C.

The amounts of the above components may be varied in a wide ranging fashion to produce rubbers of the present invention. Each of the components of the present invention are present in amounts as follows:

| Component | Lower Limit parts by weight | Upper Limit parts by weight |
| --- | --- | --- |
| (a) | 5 | 100 |
| (b) | 0.2 | 95 |
| (c) | 0.2 | 75 |
| (d) | 0 | 30 |
| (e) | 0.1 | 5 |
| (f) | 15 | 80 |
| (g) | 0.01 | 1.5 |
| Extending fillers | 0 | 80 |
| Other Additives | 0 | 10 |

The first four components (a)+(b)+(c)+(d) must sum to 100 parts by weight and the total alkenyl level of the mixture of the four component gums (a), (b), (c), and (d) ranges between 0.21 weight percent and about 3.00 weight percent.

Applicants note that it is a standard chemical shorthand in the field of silicone chemistry to refer to various fluids, resins and gums by such general designations as MDM for an M-stopped polydiorganosiloxane where the degree of polymerization of the repeating D units is unspecified except as to viscosity, of the resulting polymer. Thus more particularly, $MD_xM$, where x is a stoichiometric coefficient indicating a degree of polymerization would vary and low values of x produce pourable fluids, intermediate values of x produce more viscous fluids, and high values produce gums and that as x increases so does viscosity. Thus in terms of notation and equivalence, $MD^{vi}DM$ is exemplary of a chemical shorthand where the structure of the polymer more properly possesses stoichiometric subscripts, i.e. $MD^{vi}_xD_yM$, and these relate directly to degree of polymerization and viscosity. By stipulating a viscosity for a given polymeric silicone, these stoichiometric subscripts are defined, even if their presence must be inferred from the chemical shorthand used.

The vinyl specific peroxide curing agent (g) may be any one of several known in the art as taught in U.S. Pat. No. 4,539,357 at column 9 lines 1 et seq. Applicants specifically prefer the use of 2,5-dimethyl-tert-butyl-peroxy-hexane; 2,4-dichloro-benzoylperoxide, di-cumyl-peroxide, and 1,1-di(tert-butylperoxytrimethyl)cyclohexane or mixtures thereof.

The formulation of the present invention is unique insofar as the elimination of process aids is now possible. Heretofore it has been necessary to add some small quantity of very low viscosity silanol or methoxy stopped fluids to prevent structuring of the filler when the mixture of gums and fumed silica filler is mixed together to form the precursor mixture to the composite and also to lower the viscosity of the very high viscosity gums used to make the precursor mixture since the lower viscosity aids in processing the mixture in milling equipment. U.S. Pat. No. 4,539,357 discusses the necessary use of process aids in the manufacture of heat cured rubbers from gums at column 10 line 53 et seq. The addition of such process aids has several serious drawbacks in the art of heat curable rubber compositions. At temperatures below about 150° C. the presence of a very low viscosity silicone fluid decreases heat stability and compression set of the final product rubber. At temperatures above about 150° C., the process aids tend to act as de-polymerization catalysts.

Another other unique aspect of the present invention regards the surface properties of the fumed silica filler used as a reinforcing filler in the heat curable compositions of the present invention. Various forms of untreated and treated pyrogenic or fumed silica fillers have been employed. Frequently the treatments of choice involve treating with low molecular weight cyclic oligomeric silicones such as octamethylcyclotetrasiloxane or silazane species such as hexamethyldisilazane. The art of such treated fillers has even involved double treating of such materials, first with a silazane followed by a finishing treatment with a low molecular weight cyclic oligomer. Usually these treatments are conducted in situ and on an ad hoc basis. Frequently, the techniques have been such that process aids are selected for their ability to fulfill a dual function, that is to reduce the viscosity of the gum blend and treat the surface of the fumed silica reinforcing filler, simultaneously. Applicants have discovered that it is immaterial whether the pyrogenic or fumed silica is treated once or twice, in situ or ex situ, and the critical properties of the treated filler are not so much an extensive property such as surface area but an intensive property, the surface density of unreacted hydroxyl terminations.

In amorphous materials high surface area materials such as silicas, aluminas, silica-alumina co-gels and the like, the high frequency of crystallographic stacking faults, Schottkey and Frenkel defects that give rise to very low crystallite size and thus high surface area, lead to deficiencies in satisfying the oxidation state of the primary cations involved in the structure. Whether the structure is inorganic and thus relies on the presence of oxygen or sulfur for the anions or organic as in the case of activated carbon, the valence deficiencies that occur as a consequence of the phase boundary where the structure terminates are satisfied by hydrogen. With oxides this leads to surface hydroxyl groups. In the case of silicas, these surface hydroxyl or silanol groups readily inter-condense forming Si-O-Si bonds between adjacent particles that lead to structuring of the silica particles. Irrespective of how this intensive property is controlled, when the surface hydroxyl or silanol density of a fumed silica is below a threshold value of roughly 3.1 hydroxyls/$nm^2$, structuring either does not occur or is minimized to a point where it does not appreciably interfere with processing of the gum filler mixture. Prior art treatments may have accomplished this control to a greater or lesser degree, however it is not the treatment per se that is important but reducing the surface concentration of hydroxyl or silanol groups on the silica surface that is critical.

The elimination of process aids and the control of surface intensive properties of the silica filler leads to significant advantages. Mixtures of these particular gums are cold processable and the resulting heat curable rubbers apparently do not require the presence of additives that stabilize the cured rubber to the effects of petroleum derived oils.

The essential components of the heat curable rubbers of the present invention are the vinyl silicone gums which may be any of (a), (b), or (c); the mold release agent, the vinyl specific peroxide curing agent, and the reinforcing fumed or pyrogenic silica filler. To this mixture may be added extending fillers such as precipitated silica, finely divided quartz, mica, alumina, titania, and the like. Additionally, additive materials which impart specific performance features the finished cured rubber composition may also be incorporated such as zinc oxide, magnesium oxide, copper oxide, ferrous oxide, ferric oxide, aluminum oxide, titanium dioxide, ceric oxide, ceric hydroxide, and the various metal salts of long chain fatty acids such as the metal octoates.

The cold processable or mixable heat curable rubbers of the present invention have improved compression set, improved oil resistance, and improved compression stress relaxation, i.e. sealing force retention. By cold processable or mixable Applicants define a mixing process conducted below about 100° C.

The following examples are illustrative of the invention and serve as demonstrative examples only. By being set forth as examples of the invention, the following examples are not intended to limit the scope of the invention as conceived by the Applicants. All U.S. patent referenced herein are herewith specifically included by reference.

EXPERIMENTAL

EXAMPLE 1

An organopolysiloxane composition containing 0.2 mole % alkenyl as vinyl was prepared by blending in a non-heated mixer such as a Banbury mixer, a mixture composed of 67 parts by weight of a vinyl stopped polydimethysiloxane gum having a vinyl content of 225 wppm vinyl and a viscosity of 225,000 poise, 33 parts by weight of methyl stopped dimethysiloxane, vinylmethylsiloxane copolymer gum having a vinyl content of 0.2 weight percent and a viscosity of 400,000 poise, 0.5 parts by weight of an MQ siloxane resin, 40 parts by weight of a fumed silica having a surface hydroxyl concentration below 3.1 hydroxyls or silanols per square nano-meter (nm) wherein the surface hydroxyl concentration was reduced to below this level by treatment with octamethylcyclotetrasiloxane followed by treatment with hexamethyldisilazane having a surface area of 200 m²/g; 20 parts by weight of 5 μm Minusil®, 1.0 parts by weight zinc oxide, 0.25 parts by weight magnesium oxide, 0.45 parts by weight cerium hydroxide, and 0.12 parts by weight black iron oxide (ferrous oxide). This composition was thoroughly mixed while keeping the temperature below about 65° C. Following the addition of the foregoing components, 0.65 parts by weight of 2,5-dimethyl-di-(tertiary-butyl-peroxy) hexane was added as a free radical cure catalyst and after two minutes of mixing the batch was discharged, extruded through a 150 mesh screen, press cured at 177° C. for 17 minutes and tested for physical properties. The physical properties are summarized in Table 1.

EXAMPLE 2

An organopolysiloxane composition containing 0.2 mole % alkenyl as vinyl was prepared and cured as described in Example 1 except that the gum was a vinyl stopped dimethylsiloxane vinylmethylsiloxane copolymer gum having 800 wppm vinyl and a viscosity of 225,000 poise. The physical properties of this composition are listed in Table 1.

EXAMPLE 3

An organopolysiloxane composition containing 0.4 mole % alkenyl as vinyl was prepared by blending in a non-heated mixer, i.e. a Banbury mixer, a mixture composed of 90 parts by weight of a vinyl stopped polydimethylsiloxane gum having a vinyl content of 225 wppm vinyl, and a viscosity of 225,000 poise, 10 parts by weight of a vinyl stopped dimethylsiloxane vinylmethylsiloxane copolymer gum having 4.0 weight per cent vinyl and a viscosity of 580,000 poise, 0.5 parts by weight of an MQ siloxane resin, 35 parts by weight of a fumed silica as in Example 1; 15 parts by weight of 5 μm Minusil®, 1.0 part by weight of zinc oxide, 0.25 parts by weight of magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.61 parts by weight of 2,5-dimethyl-di-(tertiary-butyl-peroxy) hexane was added as a free radical cure catalyst and after two minutes of mixing the batch was discharged, extruded through a 150 mesh screen, press cured at 177° C. for 17 minutes and tested for physical properties. The physical properties are summarized in Table 1.

EXAMPLE 4

An organopolysiloxane composition containing 0.4 mole % alkenyl as vinyl was prepared by blending in a non-heated mixer, i.e. a Banbury mixer, a mixture composed of 80 parts by weight of a vinyl stopped polydimethylsiloxane gum having a vinyl content of 225 wppm vinyl, and a viscosity of 225,000 poise, 10 parts by weight of vinyl stopped dimethylsiloxane vinylmethylsiloxane copolymer gum having a vinyl content of 4.0 weight per cent and viscosity of 580,000 poise, 10 parts by weight of a methyl stopped polydimethylsiloxane gum having a viscosity of 225,000 poise, 0.5 parts by weight of an MQ resin, 40 parts by weight of a fumed silica as in Example 1, 20 parts by weight of 5 μm Minusil®, 1.0 parts by weight zinc oxide, 0.25 parts by weight magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.65 parts by weight of 2,5-dimethyl-di-(tertiary-butylperoxy) hexane was added as a free radical cure catalyst and after two minutes of mixing the batch was discharged, extruded through a 150 mesh screen, press cured at 177° C. for 17 minutes and tested for physical properties. The physical properties are summarized in Table 1.

EXAMPLE 5

An organopolysiloxane composition containing 0.6 mole % alkenyl as vinyl was prepared by blending in a non-heated mixer, i.e. a Banbury mixer, a mixture composed of 80 parts by weight of a vinyl; stopped polydimethylsiloxane gum having 225 wppm vinyl and a viscosity of 225,000 poise, 20 parts by weight of a vinyl stopped dimethylsiloxane vinylmethylsiloxane copolymer gum having 4.0 weight per cent vinyl and a viscosity of 580,000 poise, 0.5 parts by weight of an MQ siloxane resin, 30 parts by weight of a fumed silica as in Example 1, 10 parts by weight of 5 μm Minusil®, 1.0 parts by weight of zinc oxide, 0.25 parts by weight magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.57 parts by weight of 2,5-dimethyl-di-(tertiary-butyl-peroxy) hexane was added as a free radical cure catalyst and after two minutes of mixing the batch was discharged, extruded through a 150 mesh screen, press cured at 177° C. for 17 minutes and tested for physical properties. The physical properties are summarized in Table 1.

EXAMPLE 6

An organopolysiloxane composition containing 0.8 mole % alkenyl as vinyl was prepared by blending in a non-heated mixer, i.e. a Banbury mixer, a mixture composed of 75 parts by weight of a vinyl stopped dimethylsiloxane vinylmethylsiloxane copolymer gum having 800 wppm vinyl and a viscosity of 225,000, 15 parts by weight of a vinyl stopped dimethylsiloxane vinylmethylsiloxane copolymer gum having a vinyl content of 4.0 weight percent and a viscosity of 580,000 poise, 15 parts by weight a methyl stopped polydimethylsiloxane gum having a viscosity of 225,000 poise, 35 parts by weight of a fumed silica as in Example 1, 15 parts by weight of 5 μm Minusil®, 1.0 parts by weight of zinc oxide, 0.25 parts by weight magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.61 parts by weight of 2,5-dimethyl-di-(tertiary-butyl-peroxy) hexane was added as a free radical cure catalyst and after two minutes of mixing the batch was discharged, extruded through a 150 mesh screen, press cured at 177° C. for 17 minutes and tested for physical properties. The physical properties are summarized in Table 1.

EXAMPLE 7

An organopolysiloxane composition containing 0.6 mole % alkenyl as vinyl was prepared by blending in a non-heated mixer, i.e. a Banbury mixer, a mixture composed of 80 parts by weight of a vinyl stopped polydimethylsiloxane gum having a vinyl content of 225 wppm vinyl and a viscosity of 225,000 poise, 20 parts by weight of a vinyl stopped dimethylsiloxane vinylmethylsiloxane copolymer gum having a vinyl content of 4.0 weight per cent and a viscosity of 580,000 poise, 0.5 parts by weight of an MQ siloxane resin, 35 parts by weight of a fumed silica as in Example 1, 19 parts by weight of 5 μm Minusil®, 1.0 parts by weight of zinc oxide, 0.25 parts by weight magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.57 parts by weight of 2,5-dimethyl-di-(tertiary-butyl-peroxy) hexane was added as a free radical cure catalyst and after two minutes of mixing the batch was discharged, extruded through a 150 mesh screen, press cured at 177° C. for 17 minutes and tested for physical properties. The physical properties are summarized in Table 1.

EXAMPLE 8

An organopolysiloxane composition containing 0.5 mole % alkenyl as vinyl was prepared by blending in a non-heated mixer, i.e. a Banbury mixer, a mixture composed of 75 parts by weight of a vinyl stopped polydimethylsiloxane gum having a vinyl content of 225 wppm and a viscosity of 225,000 poise, 15 parts by weight of a vinyl stopped dimethylsiloxane vinylmethylsiloxane copolymer gum having a vinyl content of 4.0 weight percent and a viscosity of 580,000 poise, 10 parts by weight of a methyl stopped polydimethylsiloxane gum having a viscosity of 225,000 poise, 0.5 parts by of an MQ siloxane resin, 45 parts by weight of a fumed silica as in Example 1, 25 parts by weight of 5 μm Minusil®, 1.0 parts by weight of zinc oxide, 0.25 parts by weight magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.65 parts by weight of 2,5-dimethyl-di-(tertiary-butyl-peroxy) hexane was added as a free radical cure catalyst and after two minutes of mixing the batch was discharged, extruded through a 150 mesh screen, press cured at 177° C. for 17 minutes and tested for physical properties. The physical properties are summarized in Table 1.

EXAMPLE 9

An organopolysiloxane composition containing 0.6 mole % alkenyl as vinyl was prepared by blending in a non-heated mixer, i.e. a Banbury mixer, a mixture composed of 70 parts by weight of a vinyl stopped polydimethylsiloxane gum having a vinyl content of 225 wppm and a viscosity of 225,000 poise, 20 parts by weight of a vinyl stopped dimethylsiloxane vinylmethylsiloxane copolymer gum having a vinyl content of 4.0 weight per cent and a viscosity of 580,000 poise, 10 parts by weight of a methyl stopped polydimethylsiloxane gum having a viscosity of 225,000 poise, 0.5 parts by weight of an MQ siloxane resin, 39 parts by weight of a fumed silica as in Example 1, 15 parts by weight of 5 μm Minusil®, 1.0 parts by weight of zinc oxide, 0.25 parts by weight magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.65 parts by weight of 2,5-dimethyl-di-(tertiary-butyl-peroxy) hexane was added as a free radical cure catalyst and after two minutes of mixing the batch was discharged, extruded through a 150 mesh screen, press cured at 177° C. for 17 minutes and tested for physical properties. The physical properties are summarized in Table 1.

EXAMPLE 10

Compression Stress Relaxation (CSR) Test Method

An "O" ring test piece having an inner diameter of 12.7 mm and an outer diameter of 19.0 mm is cut from an ASTM slab of a press cured composition. The thickness of the "O" ring is measured at four places on the ring, with each measurement offset by a radial angle 90° relative to the previous measurement. The "O" ring is placed between parallel plates of a Shawbury-Wallace test device or jig that has been fleshly cleaned and lightly oiled with IRM-903 oil as test fluid. The sample is then compressed 25% based on the initial average of the 4 four thickness measurements and after about 30 minutes of compression at ambient temperature, an initial counter force was determined by measuring the counter force on a Shawbury-Wallace compression stress relaxometer and subtracting the jig break force. The jig is then immersed in IRM-903 oil at 150°±2° C. to a depth covering the top parallel plate of the jig. At 168 hour intervals the jig is removed from the oil bath and the counter force measured after 4 hours at ambient temperature. The percent sealing force retention is then calculated by dividing the interval counter force by the initial counter force and multiplying by 100.

TABLE 1

Physical Properties of Alkenyl Gum Heat Curable Rubbers

| Example Property | 1 | 2 | 3 | 4 | 5 | 6 | 7 | 8 | 9 |
|---|---|---|---|---|---|---|---|---|---|
| Shore A | 45 | 46 | 47 | 50 | 50 | 53 | 59 | 59 | 59 |
| Tensile (psi) | 1059 | 980 | 1033 | 1112 | 993 | 800 | 1002 | 1084 | 1084 |
| Elongation % | 560 | 524 | 584 | 642 | 318 | 298 | 274 | 444 | 330 |
| 100% Modulus (psi) | 135 | 121 | 178 | 198 | 315 | 251 | 439 | 405 | 425 |
| Compression Set 22 Hours at 177° C. | 9.7 | 8.4 | 10.0 | 12.2 | 6.3 | 7.8 | 12.3 | 13.6 | 10.7 |
| CSR, % Sealing Force Retention | | | | | | | | | |
| 168 hrs | 43 | 41 | 38 | 41 | 55 | 47 | 49 | 44 | 41 |
| 1000 hrs | 23 | * | * | 25 | 33 | 34 | 30 | 27 | 27 |
| 2000 hrs | ** | — | — | ** | 19 | 26 | 18 | 17 | 18 |

Notes:
*One week data only
**Data at 1000 hours

EXAMPLE 11

In order to show the effect of different fillers on compression set, an organopolysiloxane composition containing 0.6 mole 5 alkenyl as vinyl was prepared by blending in a non-heated mixer, i.e. a Banbury mixer, a mixture composed of 80 parts by weight of a vinyl stopped polydimethylsiloxane gum having a vinyl content of 225 wppm vinyl and a viscosity of 225,000 poise, 20 parts by weight of a vinyl stopped dimethylsiloxane vinylmethylsiloxane copolymer gum having a weight percent vinyl content of 4.0 weight percent vinyl and viscosity of 580,000 poise, 0.5 parts by weight of an MQ siloxane resin, 30 parts by weight of an octamethylcyclotetrasiloxane treated fumed silica having a surface area of 200 m$^2$/g and a surface hydroxyl content in excess of 2.75×10$^9$ hydroxyls/m$^2$, 10 parts by weight of 5 μm Minusil®, 1.0 parts by weight of zinc oxide, 0.25 parts by weight magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.60 parts by weight of 2,5-dimethyl-di-(tertiary-butyl-peroxy) hexane was added as a free radical cure catalyst and after two minutes of mixing the batch was discharged, extruded through a 150 mesh screen, press cured at 177° C. for 17 minutes and tested for physical properties. The physical properties are summarized in Table 2.

EXAMPLE 12

In order to demonstrate the effect of silanol process aids on compression, an organopolysiloxane composition containing 0.6 mole % alkenyl as vinyl was prepared by blending in a non-heated mixer, i.e. a Banbury, 80 parts by weight of a vinyl stopped polydimethylsiloxane gum having a vinyl content of 225 wppm vinyl and a viscosity of 225,000 poise, 20 parts by weight of a vinyl stopped dimethylsiloxane vinylmethylsiloxane copolymer gum having a vinyl content of 4.0 weight per cent vinyl and a viscosity of 580,000 poise, 0.5 parts by weight of an MQ siloxane resin, and 30 parts by weight of a fumed silica as in Example 1, 2.0 parts by weight of a silanol stopped fluid having 6.0 weight per cent silanol and a viscosity of 35 centistokes, 10 parts by weight of 5 μm Minusil®, 1.0 parts by weight of zinc oxide, 0.25 parts by weight magnesium oxide, 0.45 parts by weight of cerium hydroxide, and 0.12 parts by weight of black iron oxide. The formulation was thoroughly mixed while keeping the temperature under 65° C. Following the addition of the foregoing components, 0.60 parts by weight of 2,5-dimethyl-di-(tertiary-butyl-peroxy) hexane was added as a free radical cure catalyst and after two minutes of mixing the batch was discharged, extruded through a 150 mesh screen, press cured at 177° C. for 17 minutes and tested for physical properties. The physical properties are summarized in Table 2.

TABLE 2

Physical Properties of Alkenyl Gum Heat Curable Rubbers

| Example Property | 11 | 12 |
|---|---|---|
| Shore A | 56 | 50 |
| Tensile (psi) | 1042 | 1003 |
| Elongation % | 267 | 316 |
| 100% Modulus (psi) | 449 | 293 |
| Compression Set at 22 hrs at 177° C., % | 39.7 | 18.4 |

EXAMPLE 13

An organopolysiloxane composition containing 0.6 mole % vinyl was prepared by blending in a non-heated mixer, such as a Banbury mixer, a mixture composed of 70 parts by weight of a vinyl stopped polydimethylsiloxane gum having a vinyl content of 225 ppm vinyl and a viscosity of 225,000 poise, 20 parts by weight of a vinyl stopped dimethylsiloxane vinylmethylsiloxane copolymer gum having a vinyl content of 4.0 weight percent vinyl and a viscosity of 580,000 poise, 10 parts by weight of a methyl stopped polydimethylsiloxane gum having a viscosity of 225,000 poise, 0.5 parts by weight of a siloxane MQ resin where M is trimethylsilyl and the M to Q ratio ranges from between 0.8:1.0 to about 0.8:1.5, 39 parts by weight of fumed silica having a surface hydroxyl concentration below 2.75×10$^9$ hydroxyls or silanols wherein the surface hydroxyl concentration was reduced to below this level by treatment with octamethylcyclotetrasiloxane followed by treatment with hexamethyldisilazane having a surface area of 200 m$^2$/g; and 15 parts by weight of 5 μm Minusil®, the entire formulation totaling 154.5 parts by weight. The formulation was thoroughly mixed keeping the temperature of the composition below about 65° C. To the mixing composition was added 0.65 parts by weight, now 155.15 parts by weight total, of 2,5-dimethyl-di-(tertiary-butylperoxy)hexane cure catalyst. After two additional minutes of mixing the batch was discharged passed through a 150 mesh screen, press cured at 177° C. for 17 minutes and evaluated for physical properties. The physical properties of this composition are listed in Table 3.

TABLE 3

Physical Properties of Alkenyl Gum Heat Curable Rubbers

| Example Property | 11 | 12 | 13 |
|---|---|---|---|
| Shore A | 56 | 50 | 45 |
| Tensile (psi) | 1042 | 1003 | 1059 |
| Elongation % | 267 | 316 | 560 |
| 100% Modulus (psi) | 449 | 293 | 135 |
| Compression Set at 22 hrs at 177° C., % | 39.7 | 18.4 | 9.7 |
| % Sealing Force Retention | | | |
| at 168 hrs | valid numbers | | 43 |
| at 1000 hrs | not possible | | 27 |
| at 2000 hrs | with csr > 30 | | 15 |

Having described the invention, that which is claimed is:
1. A cold processable heat curable alkenyl silicone rubber composition comprising:
   (1) 100 parts by weight of an alkenyl silicone gum or mixture of alkenyl silicone gums selected from the group of alkenyl silicone gums having the formula:

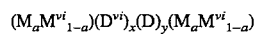

$$(M_aM^{vi}_{1-a})(D^{vi})_x(D)_y(M_aM^{vi}_{1-a})$$

where a is zero or one and x and y are zero or integers whereby the sum of x+y yields a gum having a viscosity ranging from about 200,000 to about 200,000,000 centipoise at 25° C. and whereby the sum of a+x+y yields a gum having an alkenyl content ranging from about 0.20 to about 14.00 weight percent, subject to the limitation that x must be greater than zero when a is one, where M=R$^1_3$SiO$_{1/2}$ with R$^1$ selected from the group consisting of 1 to 8 carbon atom alkyl groups, phenyl, and trifluoropropyl;

M$^{vi}$=R$^2$(R$^1$)$_2$SiO$_{1/2}$ with R$^1$ selected from the group consisting of 1 to 8 carbon atom alkyl groups, phenyl, and trifluoropropyl and R$^2$ selected from the group of 2 to 10 carbon atom linear or cyclic alkenyl groups;

D$^{vi}$=R$^2$(R$^1$)SiO$_{2/2}$ where R$^1$ and R$^2$ are as previously defined;

D=(R$^3$)$_2$SiO$_{2/2}$ where each R$^3$ is independently selected from the group consisting of 1 to 8 carbon atom alkyl groups, phenyl, and trifluoropropyl;

(2) from about 0.01 to about 1.5 parts by weight of a vinyl specific peroxide curing agent whereby the total weight of (1) and (2) ranges from 100.01 parts by weight to about 101.5 parts by weight; and (3) from about 15 to about 80 part by weight of a fumed silica filler functioning as a reinforcing filler, having a BET surface area in the range of 90–400 m²/gm where the residual level of surface hydroxyl groups determined by nitrogenous base chemisorption and magic angle spinning solid state nmr is below a threshold value of 3.1 hydroxyl groups/nm².

2. A cold processable heat curable alkenyl silicone rubber composition comprising:

(1) 100 parts by weight of a mixture of alkenyl silicone gums selected from the group of alkenyl silicone gums having the formula:

$$(M_aM^{vi}{}_{1-a})(D^{vi})_x(D)_y(M_aM^{vi}{}_{1-a})$$

where a is zero or one and x and y are zero or integers whereby the sum of x+y yields a gum having a viscosity ranging from about 200,000 to about 200,000,000 centipoise at 25° C. and whereby the sum of a+x+y yields a gum having an alkenyl content ranging from about 0.20 to about 14.00 weight percent, subject to the limitation that x must be greater than zero when a is one, where $M=R^1{}_3SiO_{1/2}$ with $R^1$ selected from the group consisting of 1 to 8 carbon atom alkyl groups, phenyl, and trifluoropropyl;

$M^{vi}=R^2(R^1)_2SiO_{1/2}$ with $R^1$ selected from the group consisting of 1 to 8 carbon atom alkyl groups, phenyl, and trifluoropropyl and $R^2$ selected from the group of 2 to 10 carbon atom linear or cyclic alkenyl groups;.

$D^{vi}=R^2(R^1)SiO_{2/2}$ where $R^1$ and $R^2$ are as previously defined;

$D=(R^3)_2SiO_{2/2}$ where each $R^3$ is independently selected from the group consisting of 1 to 8 carbon atom alkyl groups, phenyl, and trifluoropropyl wherein said mixture of alkenyl silicone gums comprises at least three gums defined by the formulas:
(i) $M^{vi}D^{vi}DM^{vi}$;
(ii) $M^{vi}DM^{vi}$; and
(iii) $MD^{vi}M$;

(2) from about 0.01 to about 1.5 parts by weight of a vinyl specific peroxide curing agent whereby the total weight of (1) and (2) ranges from 100.01 parts by weight to about 101.5 parts by weight; and (3) from about 0.0001 to about 30 parts by weight of a diluent gum having the formula:

$$MDM,$$

and having a viscosity ranging from 200,000 to 200,000,000 centipoise at 25° C.

3. The composition of claim 2 further comprising a fumed silica filler functioning as a reinforcing filler, having a BET surface area in the range of 90–400 m²/gm where the residual level of surface hydroxyl groups determined by nitrogenous base chemisorption and magic angle spinning solid state nmr is below a threshold value of 3.1 hydroxyl groups/nm².

4. A cold processable heat curable alkenyl silicone rubber composition comprising:

(a) from about 5 parts by weight to about 100 parts by weight of a vinyl on chain vinyl stopped gum having the formula:

$$M^{vi}D^{vi}{}_xD_yM^{vi}$$

where x and y are different integers greater than zero and the sum of x and y have values whereby the viscosity of (a) is between 200,000 and 200,000,000 cps and the alkenyl level varies from about 0.20 weight percent to about 14.00 weight percent;

(b) from about 0.2 parts by weight to about 95 parts by weight of a vinyl stopped gum having the following formula:

$$M^{vi}D_zM^{vi}$$

where z is an integer greater than zero having a value whereby the viscosity of (b) is between 200,000 and 200,000,000 cps and the alkenyl level varies from about 150 to about 350 weight parts per million;

(c) from 0.2 parts by weight to about 75 parts by weight of a vinyl on chain gum having non-reactive end groups with the following formula:

$$MD^{vi}{}_qM$$

where q is an integer greater than zero whereby the viscosity of (c) is between 200,000 and 200,000,000 cps and the alkenyl level varies from about 0.10 weight per cent to about 14.00 weight percent;

(d) from about 0.0001 parts by weight to about 30 parts by weight of a diluent gum having the following formula:

$$MD_wM$$

where w is an integer greater than zero whereby the viscosity of (d) is between 200,000 and 200,000,000 cps;
whereby the quantifies present of the components (a), (b), (c), and (d) add to 100 parts by weight;

(e) from about 0.1 parts by weight to about 5 parts by weight of an MQ resin, as a mold release agent, having a viscosity between 500 and 50,000 centipoise, where the M:Q ratio between about 0.8:1.0 and about 0.8:1.5;
whereby the quantities present of the components (a), (b), (c), (d), and (e) add to between about 100.1 parts by weight to about 105 parts by weight;

(f) from about 15 to about 80 parts by weight of a fumed silica filler functioning as a reinforcing filler, having a BET surface area in the range of 90–400 m²/gm where the residual level of surface hydroxyl groups determined by nitrogenous base chemisorption and magic angle spinning solid state nmr is below a threshold value of 3.1 hydroxyl groups/nm₂; whereby the quantities present of the components (a), (b), (c), (d), (e) and (f) add to between 115.1 parts by weight and 185 parts by weight;

(g) from about 0.01 to about 1.5 parts by weight of a vinyl specific peroxide curing agent; whereby the quantities present of the components (a), (b), (c), (d), (e), (f) and (g) add to between 115.11 parts by weight and 186.5 parts by weight; where:

$M=R^1{}_3SiO_{1/2}$ with $R^1$ selected from the group consisting of 1 to 8 carbon atom alkyl groups, phenyl, and trifluoropropyl;

$M^{vi}=R^2(R^1)_2SiO_{1/2}$ with $R^1$ selected from the group consisting of 1 to 8 carbon atom alkyl groups, phenyl, and trifluoropropyl and $R^2$ selected from the group of 2 to 10 carbon atom linear or cyclic alkenyl groups;

$D^{vi}=R^2(R^1)SiO_{2/2}$ where $R^1$ and $R^2$ are as previously defined;

$D=(R^3)_2SiO_{2/2}$ where each $R^3$ is independently selected from the group consisting of 1 to 8 carbon atom alkyl groups, phenyl, and trifluoropropyl; and $Q=SiO_{4/2}$.

5. A cold processable heat curable alkenyl silicone rubber composition consisting essentially of:

(a) from about 5 parts by weight to about 100 parts by weight of a vinyl on chain vinyl stopped gum having the formula:

$$M^{vi}D^{vi}_xD_yM^{vi}$$

where x and y are different integers greater than zero and the sum of x and y have values whereby the viscosity of (a) is between 200,000 and 200,000,000 cps and the alkenyl level varies from about 0.20 weight percent to about 14.00 weight percent;

(b) from about 0.2 parts by weight to about 95 parts by weight of a vinyl stopped gum having the following formula:

$$M^{vi}D_zM^{vi}$$

where z is an integer greater than zero having a value whereby the viscosity of (b) is between 200,000 and 200,000,000 cps and the alkenyl level varies from about 150 to about 350 weight parts per million;

(c) from 0.2 parts by weight to about 75 parts by weight of a vinyl on chain gum having non-reactive end groups with the following formula:

$$MD^{vi}_qM$$

where q is an integer greater than zero whereby the viscosity of (c) is between 200,000 and 200,000,000 cps and the alkenyl level varies from about 0.10 weight per cent to about 14.00 weight percent;

(d) from about 0.0001 parts by weight to about 30 parts by weight of a diluent gum having the following formula:

$$MD_wM$$

where w is an integer greater than zero whereby the viscosity of (d) is between 200,000 and 200,000,000 cps;

whereby the quantities present of the components (a), (b), (c), and (d) add to 100 parts by weight;

(e) from about 0.1 parts by weight to about 5 parts by weight of an MQ resin, as a mold release agent, having a viscosity between 500 and 50,000 centipoise, where the M:Q ratio between about 0.8:1.0 and about 0.8:1.5;

whereby the quantities present of the components (a), (b), (c), (d), and (e) add to between about 100.1 parts by weight to about 105 parts by weight;

(f) from about 15 to about 80 parts by weight of a fumed silica filler functioning as a reinforcing filler, having a BET surface area in the range of 90–400 $m^2$/gm where the residual level of surface hydroxyl groups determined by nitrogenous base chemisorption and magic angle spinning solid state nmr is below a threshold value of 3.1 hydroxyl groups/$nm^2$; whereby the quantities present of the components (a), (b), (c), (d), (e) and (f) add to between 115.1 parts by weight and 185 parts by weight;

(g) from about 0.01 to about 1.5 parts by weight of a vinyl specific peroxide curing agent; whereby the quantities present of the components (a), (b), (c), (d), (e), (f) and (g) add to between 115.11 parts by weight and 186.5 parts by weight; where:

$M=R^1_3SiO_{1/2}$ with $R^1$ selected from the group consisting of 1 to 8 carbon atom alkyl groups, phenyl, and trifluoropropyl;

$M^{vi}=R^2(R^1)_2SiO_{1/2}$ with $R^1$ selected from the group consisting of 1 to 8 carbon atom alkyl groups, phenyl, and trifluoropropyl and $R^2$ selected from the group of 2 to 10 carbon atom linear or cyclic alkenyl groups;

$D^{vi}R^2(R^1)SiO_{2/2}$ where $R^1$ and $R^2$ are as previously defined;

$D=(R^3)_2SiO_{2/2}$ where each $R^3$ is independently selected from the group consisting of 1 to 8 carbon atom alkyl groups, phenyl, and trifluoropropyl; and $Q=SiO_{4/2}$.

6. A process for making a heat curable rubber composition comprising the steps of:

(a) mixing a curable component selected from the group of alkenyl silicone gums having the formula:

$$(M_aM^{vi}_{1-a})(D^{vi})_x(D)_y(M_aM^{vi}_{1-a})$$

where a is zero or one and x and y are zero or integers whereby the sum of x+y yields a gum having a viscosity ranging from about 200,000 to about 200,000,000 centipoise at 25° C. and whereby the sum of a+x+y yields a gum having an alkenyl content ranging from about 0.20 to about 14.00 weight percent, subject to the limitation that x must be greater than zero when a is one, where $M=R^1_3SiO_{1/2}$ with $R^1$ selected from the group consisting of 1 to 8 carbon atom alkyl groups, phenyl, and trifluoropropyl;

$M^{vi}=R^2(R^1)_2SiO_{1/2}$ with $R^1$ selected from the group consisting of 1 to 8 carbon atom alkyl groups, phenyl, and trifluoropropyl and $R^2$ selected from the group of 2 to 10 carbon atom linear or cyclic alkenyl groups;

$D^{vi}=R^2(R^1)SiO_{2/2}$ where $R^1$ and $R^2$ are as previously defined;

$D=(R^3)_2SiO_{2/2}$ where each $R^3$ is independently selected from the group consisting of 1 to 8 carbon atom alkyl groups, phenyl, and trifluoropropyl; with a vinyl specific peroxide curing agent; and (b) controlling the temperature of the mixing whereby the temperature of the mixture does not exceed 100° C. during the process of mixing.

7. The process of claim 6 wherein the mixing temperature does not exceed 80° C.

8. The process of claim 6 wherein the mixing temperature does not exceed 65° C.

9. An article of manufacture comprising the cured composition of claim 1.

10. The composition of claim 1 wherein component (1) is a mixture of gums.

11. The composition of claim 10 wherein said mixture comprises at least three gums defined by the formulas:

(1) $M^{vi}D^{vi}DM^{vi}$;

(2) $M^{vi}DM^{vi}$; and (3) $MD^{vi}M$.

12. The composition of claim 1 further comprising a diluent gum having the formula:

$$MDM,$$

and having a viscosity ranging from 200,000 to 200,000,000 centipoise at 25° C.

13. The composition of claim 12 wherein component (1) is a mixture of gums.

14. The composition of claim 13 wherein said mixture comprises at least three gums defined by the formulas:

(1) $M^{vi}D^{vi}DM^{vi}$;

(2) $M^{vi}DM^{vi}$; and (3) $MD^{vi}M$.

15. An article of manufacture comprising the cured composition of claim 2.

16. An article of manufacture comprising the cured composition of claim 3.

17. An article of manufacture comprising the cured composition of claim 10.

18. An article of manufacture comprising the cured composition of claim 11.

19. An article of manufacture comprising the cured composition of claim 12.

20. An article of manufacture comprising the cured composition of claim 13.

21. An article of manufacture comprising the cured composition of claim 14.

* * * * *